UNITED STATES PATENT OFFICE.

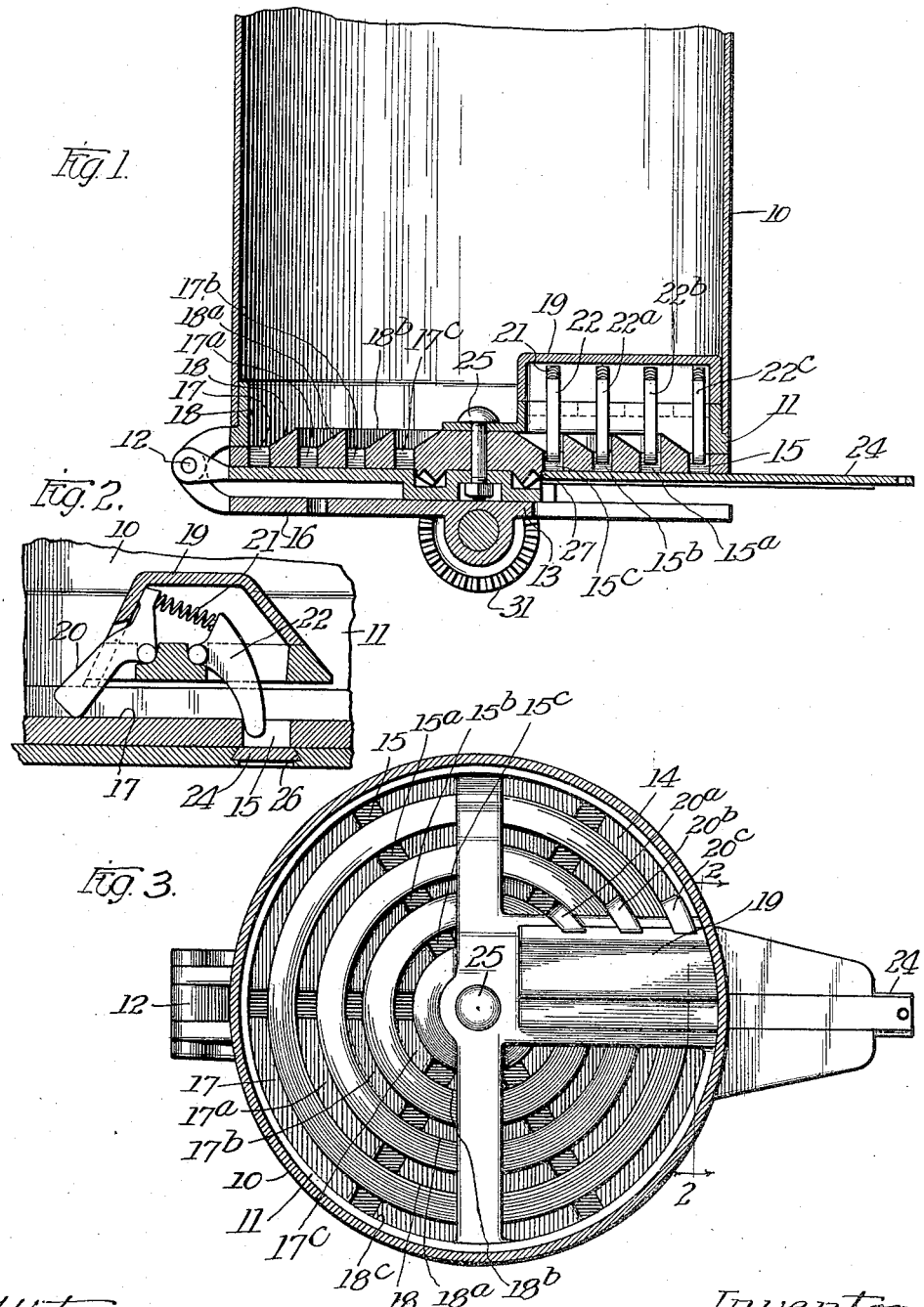

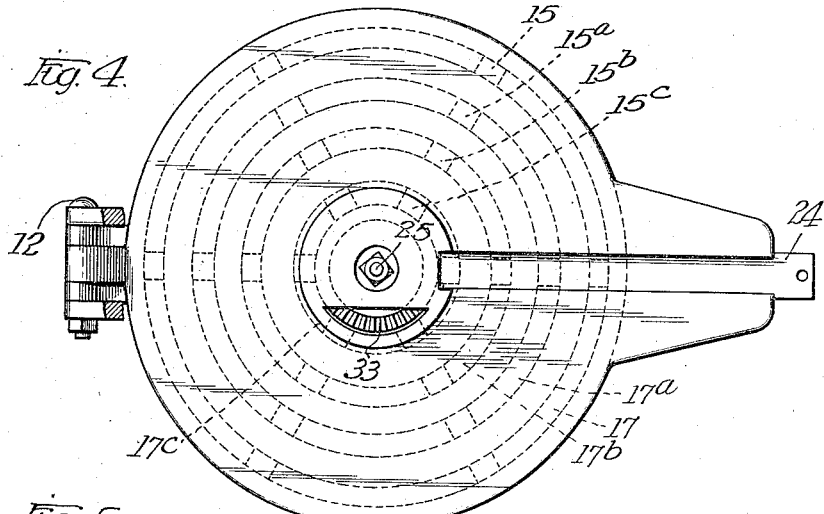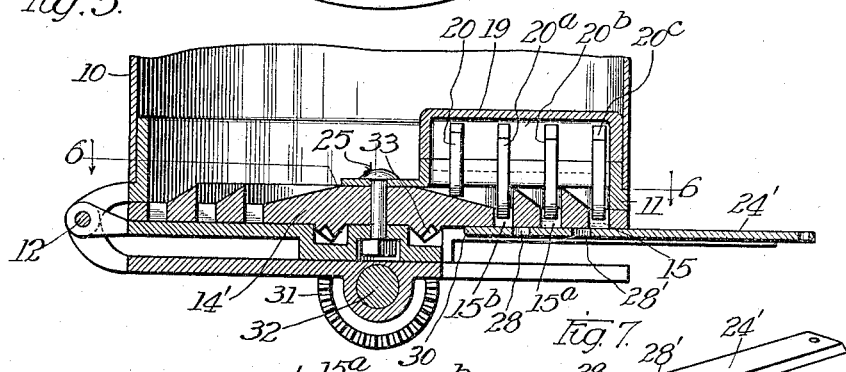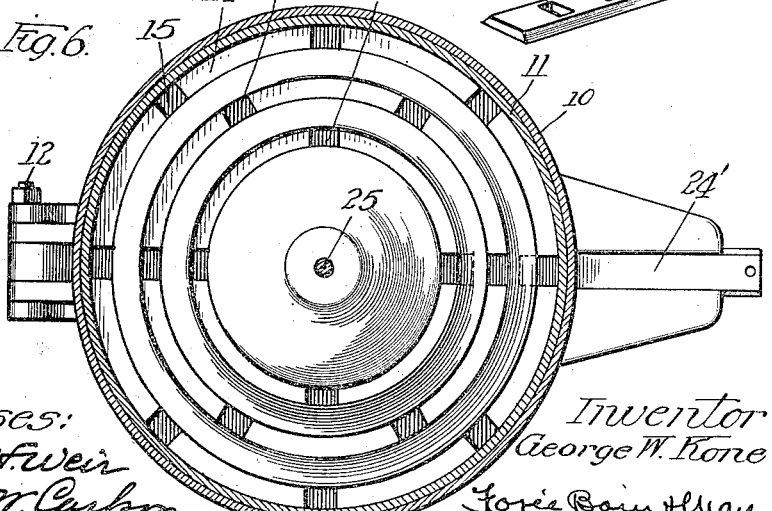

GEORGE W. KONE, OF ROCK ISLAND, ILLINOIS, ASSIGNOR OF ONE-HALF TO STEPHEN R. SPENCER, OF ROCK ISLAND, ILLINOIS.

PLANTER.

1,219,644.  Specification of Letters Patent.  Patented Mar. 20, 1917.

Application filed June 30, 1915. Serial No. 37,158.

*To all whom it may concern:*

Be it known that I, GEORGE W. KONE, a citizen of the United States, residing at Rock Island, in the county of Rock Island and State of Illinois, have invented certain new and useful Improvements in Planters, of which the following is a specification.

My invention relates to improvements in seed planters, and has especial reference to variable drop planters, such as corn planters, whereby seeds are deposited at intervals, in the progress of the machine, in suitable and variable quantities or numbers, or may be dropped, one at a time, at selected, uniform and variable distances apart, the changing of the mechanism for the accomplishment of its various functions being quickly and easily made in the embodiments about to be described.

One of the objects of my invention is to generally improve and simplify machines of the above character whereby the planting of seeds is materially facilitated and the machine, as a whole rendered very serviceable and reliable in operation and the cost of production reduced.

Other and further objects of my invention will become readily apparent to persons skilled in the art from a consideration of the following description when taken in conjunction with the drawings, wherein—

Figure 1 is a vertical central section of a seed containing can and removable seed plate.

Fig. 2 is a fragmentary section taken on line 2—2 of Fig. 3.

Fig. 3 is a transverse section taken above the seed plate shown in Fig. 1.

Fig. 4 is a bottom view of the mechanism.

Fig. 5 is a similar view to that of Fig. 1 showing a seed plate for drilling the seed instead of the hilling plate shown in the preceding figures.

Fig. 6 is a transverse section taken on line 6—6 of Fig. 5.

Fig. 7 is a valve or slide which, in connection with the seed plate is adapted to vary the distance of separation between the seeds when the same are drilled.

In all the views the same reference characters are employed to indicate similar parts.

In the present exemplification I have only shown the seed receptacle, the seed plate and the valve controlling the plate. The other portions of the driving mechanism, such for example as a corn planter is well known and understood, my invention being well adapted for operation and association with those well known parts with the exception that with my particular mechanism is not necessary to employ a clutch to vary the rate of motion of the seed plate in order to vary the number of seeds that will be dropped at a given time. One of the peculiar characteristics of my invention lies in the fact that the seed plate is operable at a uniform rate of speed, the seed plate moving no farther to drop four seeds than when one seed is dropped.

In the specific illustration 10 represents a seed receptacle secured to a base ring 11 which is hinged as at 12 to the body part of the machine 13. When the receptacle and base ring are inverted upon the hinge 12 a seed plate 14 may be readily removed and the plate 14′ substituted, if desired. The seed plate 14 is perforated at intervals in radial planes, as at 15, $15^a$, $15^b$ and $15^c$. The seed plate 14 is provided with a series of concentric depressions 17, $17^a$, $17^b$ and $17^c$, in the bottoms of which are the perforations 15 to $15^c$ inclusive. In the particular exemplification shown in Fig. 3, there are six sets of such perforations. There may be more or less. Between the concentric grooves referred to are tapered annular upwardly projecting ribs 18, $18^a$ and $18^b$, the ring 11 forming the vertical wall for the last projection, as at $18^c$. The projections 18 are tapered so that the seeds will slide down the annular surface onto the flat wall between adjacent projections and will be properly presented for reception in the perforations 15—$15^c$ of the seed plate. In the housing 19, are contained, in the illustrated exemplification of my invention four by-pass levers 20, $20^a$, $20^b$ and $20^c$, one for each of the grooves contained between adjacent projections 18. The ends of these bypass levers normally rest upon the flat lower part of the seed plate 17, being held resiliently in the contact therewith by a spring 21. Knocker levers 22, of which there are also four, one immediately behind each of the bypass levers 20, also normally rest upon the floor 17 of the seed plate. The springs 21 are used to hold the knocker levers 20 yieldingly in contact with said seed plate. As a perforation 15, which is of the proper size to contain a single grain, passes under the knocker lever 22, as shown in Fig. 2 the knocker lever enters the perforations and drives the seed therefrom, it being impelled by the spring 21. The bypass lever 20 prevents more than one seed from entering any one of the orifices 15—15ᶜ. A valve plate 24 is adapted to slide radially from the center 25 of the device in a groove 26. When this valve plate 24 is shoved as far inwardly as it will go, as shown in Fig. 1, it closes all of the perforations 15—15ᶜ of the seed plate and grain cannot fall through said perforations into the boot or other conduit of the planter. If it is desired that only one grain shall be dropped from the receptacle 10 the valve plate 24 is pulled out until the end 27 clears the inner perforation 15ᶜ of the seed plate whereupon a grain will drop from the receptacle through the perforation 15ᶜ and only through such perforation each time one of said perforations registers immediately above the end of the valve plate 24. Now if two grains are to be dropped at each successive movement of the seed plate the valve 24 is further pulled out until the end uncovers the perforation 15ᵇ of the seed plate, whereupon two grains or seeds will be dropped from the receptacle at each successive movement of the seed plate and so on, until the valve 24 may be entirely removed, at which time four grains will be dropped in the hill, this being the limit of the apparatus illustrated and it is as many seeds or kernels as is usually planted in a single hill. The seed plate 14 is intended to be used when the grain is to be hilled, or a plurality of grains are to be dropped simultaneously at suitable distance intervals.

In Fig. 6 I show a plan view of a seed plate adapted to be used for dropping single grains or seeds at uniform distances apart. The perforations through which the grains fall in the seed plate 14′ are somewhat differently disposed from those shown in the seed plate. In the seed plate 14′ there are eight perforations or cells 15 and therefore eight separate grains at eight different times will be dropped to each revolution of the seed plate 14′ when the grains are permitted to fall through these perforations. There are six perforations 15ᵃ and there will only be six grains fall when these perforations are open during a revolution of the seed plate 14; and as the third series of perforations 15ᵇ are only four in number there will be only four grains dropped at each revolution of the seed plate when these latter perforations above are uncovered.

A valve plate 24′ controls the grains to be dropped from the seed plate 14′ in the same general manner as does the valve plate 24 control the seeds to be dropped from the seed plate 14. The valve 24′ is provided with two perforations 28 and 28′. In Fig. 5 all of the perforations in the respective concentric series 15—15ᵇ are shown closed by the valve 24′. Upon moving the valve plate 24′ outwardly in a radial direction the first series of perforations to be opened and which will register with the perforation 28′ of the valve plate are the perforations 15 near the outer circumference of the seed plate so that eight seeds will fall through the perforations 15 in successive order and through the opening 28′ of the valve plate 24′. Now when the valve plate 24′ is moved farther outwardly in a radial direction the perforations 15 will be covered by the valve plate and the perforations 15ᵃ will be uncovered, registering with the perforation 28 of the valve plate 24′ so that six grains will fall in successive order through the series of perforations, 15ᵃ, at each revolution of the seed plate. When the valve plate 24′ is moved still farther outward in a radial direction the end 30 of the valve plate 24′ will uncover the inner series of perforations 15ᵇ and only four grains or seeds will be dropped at each revolution of the seed plate. It will, therefore, be noted that the valve plates 24 and 24′ control the operation of the seed plates 14 and 14′ irrespective of the mechanism employed to move said plates.

It is very desirable that the plate 14′ for drilling shall be rotated at a constant speed, and to this end I provide a beveled gear train comprising the beveled gear 31 on the drive shaft 32 in coöperative relation with a beveled gear 33 which is formed integral with the seed plate 14′. The seed plate 14 is intermittently operated by the usual means on the rocker arm instigated in its motion by means of a check wire, said intermittent motion being imparted to the seed plate 14 by suitable ratchet mechanism well known and understood and therefore not illustrated.

Seed planters, or planters generally known as corn planters are usually provided with two seed containers and two operable seed plates moved simultaneously by a common mechanism, in which construction they are so interdependent that the dropping mechanism on one side of the planter cannot be operated to perform functions different from the dropping mechanism on the opposite side of the planter. In my construction each of the seed dropping mechanisms is independent and in drilling seeds may be dropped more frequently from one receptacle and a larger number of seeds per row thereby dropped than may at the same time be released from the other or companion receptacle, as the seed controlling means in my construction is entirely independent of the mechanism employed to rotate the seed plate. Similarly in hilling a different number of kernels may be dropped into one boot than is simultaneously dropped in the other boot, thus permitting instantaneous adjustment by the operator for different conditions of soil without stopping the machine.

This characteristic of my machine is to be greatly appreciated, as at certain places and under certain conditions it is sometimes very advantageous to entirely shut off the seed receptacle on one side while seeds are being regulably dropped from the receptacle on the opposite side, and again in drilling a greater or less number of seeds for a given distance, where there is a difference in character of the ground, may be dropped from one receptacle without varying the capacity or operation of the other receptacle.

Whereas I have illustrated and described a single embodiment of my invention, it is obvious that changes may be made therein without departing from the spirit and scope of the invention.

Having described my invention, what I claim is:—

1. In a seed planter, the combination with a seed receptacle of a seed plate, a plurality of annular concentric projections on the upper surface of said plate, said plate having a plurality of seed passages positioned between the annular projections, the inner walls of said annular projections being straight and the outer walls beveled off from said vertical wall outwardly and downwardly and means for controlling the movements of seeds through said passages.

2. In a seed planter, a seed plate having a plurality of annular concentric projections on the upper face thereof, and a plurality of seed passages positioned between the annular projections, the inner annular walls of said projections being substantially vertical, and the outer walls inclined upwardly and inwardly toward the axis of the plate.

In testimony whereof I hereunto set my hand in the presence of two subscribing witnesses.

GEORGE W. KONE.

In the presence of—
W. M. OHLWEILER,
B. D. LAMONT.

Copies of this patent may be obtained for five cents each, by addressing the "Commissioner of Patents, Washington, D. C."